April 16, 1935. H. B. HULL Re. 19,534

REFRIGERATING APPARATUS

Original Filed June 30, 1930 2 Sheets-Sheet 1

INVENTOR
Harry B. Hull
BY
Spencer, Hardman and Fehr
ATTORNEY

April 16, 1935. H. B. HULL Re. 19,534

REFRIGERATING APPARATUS

Original Filed June 30, 1930 2 Sheets-Sheet 2

INVENTOR
Harry B. Hull
BY
Spencer, Hardman and Fehner
ATTORNEY

Reissued Apr. 16, 1935

Re. 19,534

UNITED STATES PATENT OFFICE 19,534

REFRIGERATING APPARATUS

Harry B. Hull, Dayton, Ohio, assignor, by mesne assignments, to General Motors Corporation, a corporation of Delaware Original No. 1,885,264, dated November 1, 1932, Serial No. 465,021, June 30, 1930. Application for reissue May 19, 1933, Serial No. 671,934

10 Claims. (Cl. 62—103)

This invention relates to refrigerating apparatus of the type which condenses moisture from the air and more particularly to apparatus for withdrawing the condensed moisture from said refrigerating apparatus.

One of the objects of the present invention is to provide automatic means for withdrawing the atmospheric condensation from an evaporator where an ordinary gravity disposal apparatus cannot be used.

More specifically it is an object to provide, in an apparatus for cooling circulating air including refrigerant circulating element having an evaporator for treating the circulated air means for withdrawing the atmospheric condensation from said evaporator by the action of said refrigerant circulating element.

Further objects and advantages of the present invention will be apparent from the following description, reference being had to the accompanying drawings, wherein a preferred form of the present invention is clearly shown.

Figure 1:
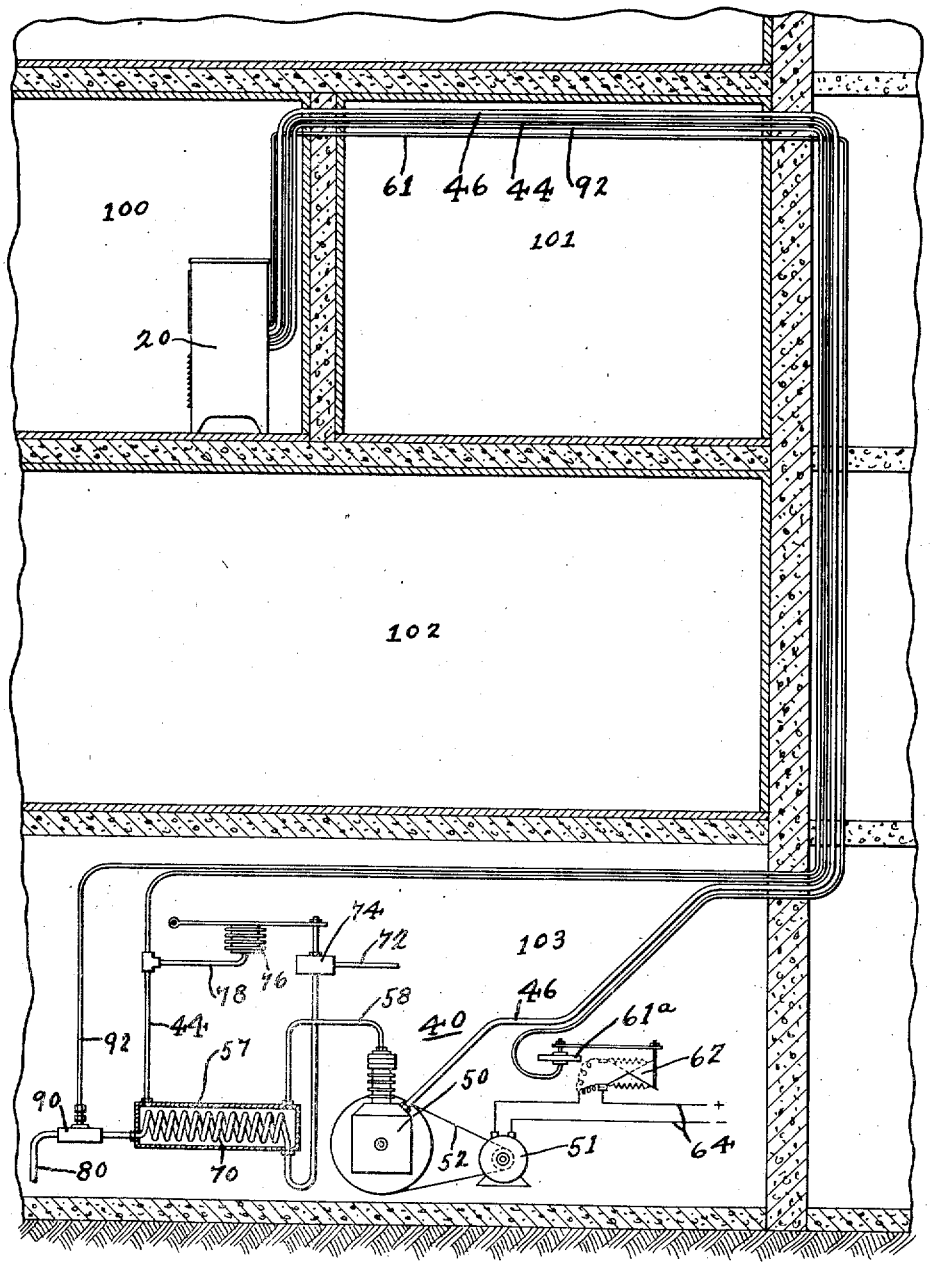
Fig. 1 is a diagrammatic illustration of a refrigerating apparatus embodying features of my invention.
Figure 2:
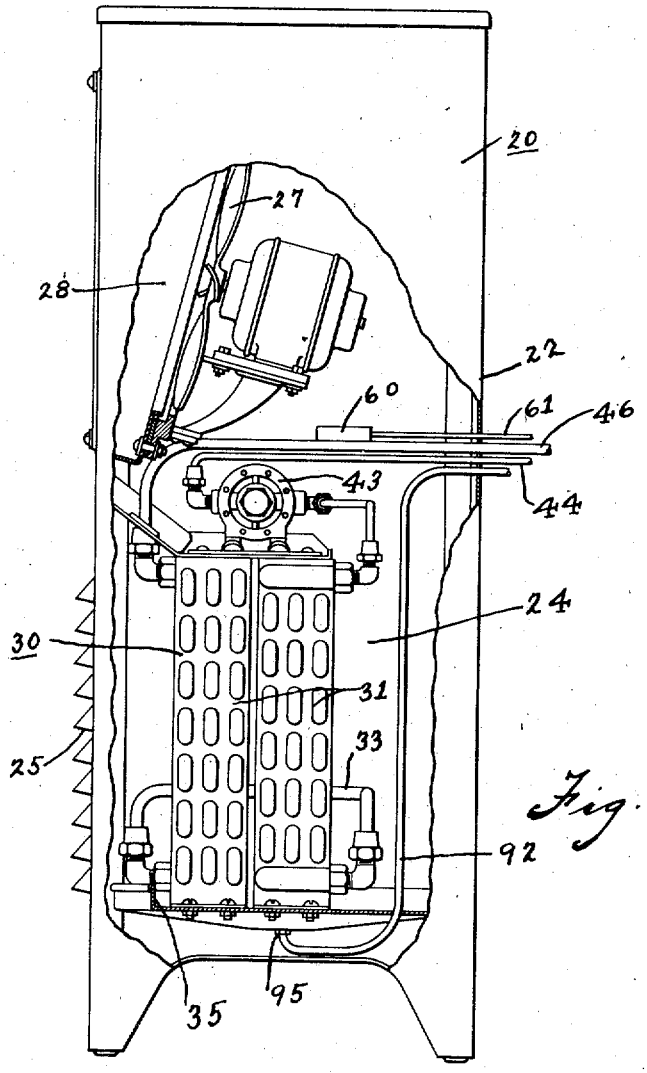
Fig. 2 is an enlarged view partly in elevation and partly broken away, of a refrigerating apparatus forming a part of the present invention.
Figure 3:
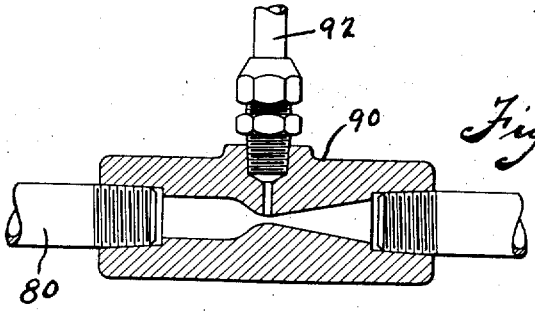
Fig. 3 is an enlarged view in cross-section of the means employed for withdrawing the condensation from the evaporator.

In an apparatus for cooling rooms in buildings there is generally a considerable amount of atmospheric moisture deposited which must be removed from the room. In many instances a gravity drain system cannot be installed or is undesirable. My invention is concerned with automatic means for removing the atmospheric moisture from the room in a simple and effective manner, and particularly by utilizing forces inherent in the apparatus for removing the moisture from the room.

Referring to the drawings, the numeral 20 designates in general an apparatus for cooling and circulating air such, for example, as in rooms. The room cooling apparatus 20 comprises in general a cabinet or casing 22 forming an air treating zone 24. The cabinet 22 is provided with louvers 25 on the front panel thereof to permit air to enter the air cooling zone 24 under the suction of an electrically or motor-driven operated fan 27 whence the air is discharged by said fan through an opening 28 thus circulating the air through said casing. The air circulating through the treating zone 24 is cooled by an evaporator 30 or refrigerant enclosing, air cooling structure comprising a plurality of cooling coils 31 within which a refrigerant is circulated and around which the air passes. The cooling coils 31 are connected in series by means of pipe 33 and are vertically disposed within the cabinet 32. The coils 31 are supported by a moisture or drip pan 35 carried by the cabinet 22 forming means for receiving the water condensed from the air by the air cooling structure on the outside of the coils. Refrigerant is circulated through the evaporator 30 by means of a refrigerant circulating and liquefying element 40 of which the evaporator 30 forms a part thereof, under the control of an expansion valve 43. Refrigerant is delivered to the coils 31 through a liquid refrigerant pipe 44 and is withdrawn through a suction pipe 46. The refrigerant circulating and liquefying element also includes a compressor 50 operatively connected with the motor 51 by belt 52. The compressor 50 compresses the gaseous refrigerant and delivers it to a water cooled condenser 57 through a pipe 58. The gaseous refrigerant is liquefied in the condenser 57 and from which it is delivered to the pipe 44. A thermostat 60 is connected by pipe 61 to an expansible element 61*a* and is adapted to control the operation of a switch 62 which connects the motor 51 to the power mains 64. The thermostat 60 is secured to the suction pipe 46 which returns the gaseous refrigerant to the compressor 50, for example, to the crankcase thereof. Thus the thermostat 60 controls the operation of the switch 62 in response to the temperature of the pipe 46 to thereby prevent refrigerating action beyond the air treating zone 24.

In order to liquefy the gaseous refrigerant in the condenser 57 I have provided an automatically controlled water flow apparatus comprising a coil 70 having an inlet 72 controlled by an automatic valve 74 actuated by an expansible bellows 76 having a pipe connection 78 with the high pressure side of a refrigerating apparatus. The coil 70 is provided with an outlet 80 which is connected to the water waste or drain system while the inlet 72 may be connected to any suitable water pressure system. By the present arrangement the valve 74 is adapted to permit the flow of water to the coil 70 only during the operation of the refrigerant circulating and liquefying element. Further details of the automatically controlled valve and its manner of operation is to be found in the patent to R. E. Bechtold et al., issued December 25, 1923.

In a room cooling apparatus of the type hereinbefore described considerable atmospheric moisture will be likely to collect on the evaporator 30 to be received in the moisture pan 35. Thus I have provided automatic means for withdrawing the atmospheric condensation from the evaporator which collects in the moisture pan 35 and have arranged said means for withdrawing water from the pan 35 by the action of the water flow apparatus operating, preferably, concomitantly with the refrigerant circulating and liquefying apparatus. The means for removing the condensation from the evaporator 30 includes a Venturi pump or ejector 90 having a connection with the water flow coil 70 and the outlet pipe 80. The venturi 90 is provided with a pipe connection 92 which leads to an outlet 95 provided in the moisture pan 35. By this arrangement the action of the water flowing through the water flow apparatus and through the venturi will cause a suction in the pipe 92 which will withdraw the water from the pan 35 and carry said water off to the waste or drain pipe 80. This arrangement is particularly advantageous where the cooling apparatus is installed in office buildings or the like as, for instance, in an installation as shown in Fig. 1 wherein there is shown diagrammatically an office building divided into a plurality of rooms 100, 101, 102 and 103. In this arrangement the room cooling apparatus is shown located in the room 100 for cooling said room while the compressor, motor and condensing unit is shown located in the apartment 103 which may be the basement of the building. In many instances the place where the room cooling apparatus is located is owned by one person while the room immediately below the room where the apparatus is located is owned by another which would prevent the installation of a gravity drain pipe and other pipes leading from the room cooling apparatus to the compressor condensing unit. In this case it would be necessary to extend the pipes 44, 46 and 92 above the drain pan and evaporator 30 to the top of the room 100 and across the room or apartment 101, which may be a hallway, and direct the pipes downwardly through some other apartment beyond the room 102 to connect said pipes to the compressor condensing unit.

From the foregoing it will be noted that I have provided a room cooling apparatus of the type which includes an evaporator and that I have arranged for automatically withdrawing the atmospheric condensation from said evaporator by the action of the refrigerant circulating and liquefying apparatus. By this arrangement the necessity of manually emptying the drain pan is obviated. The present arrangement is particularly advantageous in office buildings, for instance, over week ends and when there is no attendant in the building for emptying the pan.

While the form of embodiment of the invention as herein disclosed, constitutes a preferred form, it is to be understood that other forms might be adopted, all coming within the scope of the claims which follow.

What is claimed is as follows:

1. Refrigerating apparatus comprising in combination, a closed refrigerant circulating system including an evaporator and a water cooled condenser, said condenser having a water flow circuit associated therewith, a pan disposed below the evaporator for receiving moisture collected upon said evaporator, and means connected with the water flow circuit of said condenser and to said pan and having a portion thereof extending a substantial distance above said pan, said means being rendered effective for removing water from said pan by the flow of water through said water circuit of said condenser.

2. Refrigerating apparatus comprising in combination, a closed refrigerant circulating system including an evaporator and a water cooled condenser, said condenser having a water flow circuit associated therewith, a pan disposed below the evaporator for receiving moisture collected upon said evaporator, and a Venturi device interposed in the water flow circuit of said condenser, a conduit connected to said Venturi device and to said pan and having a portion thereof extending a substantial distance above the pan, said Venturi device being rendered effective for removing water from said pan by the flow of water through said water circuit of said condenser.

3. Refrigerating apparatus comprising in combination, a closed refrigerant circulating system including an evaporator normally tending to collect moisture thereon, said system also including a condenser, a cooling fluid medium flowing in heat exchange relationship with said condenser, means for receiving water dripping from said evaporator, and means communicating with and extending above said first named means, said last named means being rendered effective by the cooling fluid flow for removing water upwardly from said first named means.

4. Refrigerating apparatus comprising in combination a casing, a cooling element within said casing, means for circulating a refrigerating medium through said cooling element at a temperature to normally cause moisture to collect thereon, means for creating a current of air through said casing and around said cooling element, a drip catching member for receiving the water condensed from the air by said cooling element, a conduit leading upwardly from said drip catching member, a pump for causing the water to flow up said conduit, a connection with said conduit for discharging the water in liquid form from said apparatus, and said pump being rendered effective automatically and simultaneously with operation of said first named means.

5. Refrigerating apparatus comprising in combination, a closed refrigerant circulating system including an evaporator and a water cooled condenser, said condenser having a water flow circuit associated therewith, a pan disposed below the evaporator for receiving moisture collected upon said evaporator, and means connected with the water flow circuit of said condenser and to said pan, said means being rendered effective for removing water from said pan by the flow of water through said water circuit of said condenser.

6. Refrigerating apparatus comprising in combination, a closed refrigerant circulating system including an evaporator and a water cooled condenser, said condenser having a water flow circuit associated therewith, a pan disposed below the evaporator for receiving moisture collected upon said evaporator, and a Venturi device interposed in the water flow circuit of said condenser, a conduit connected to said Venturi device and to said pan, said Venturi device being rendered effective for removing water from said pan by the flow of water through said water circuit of said condenser.

7. Refrigerating apparatus comprising in combination, a closed refrigerant circulating system including an evaporator normally tending to collect moisture thereon, said system also including a condenser, a cooling fluid medium flowing in heat exchange relationship with said condenser, means for receiving water dripping from said evaporator, and means communicating with said first named means, said last named means being rendered effective by the cooling fluid flow for removing water from said first named means.

8. Room cooling apparatus comprising a refrigerant evaporating member, an air circulating member circulating air over said evaporating member, a refrigerant compressing member removing refrigerant from said evaporating member, a refrigerant condensing member receiving and condensing compressed refrigerant from said compressing member, a refrigerant expansion member receiving refrigerant from said condensing member and introducing it into said evaporating member, a moisture condensate receiver for said evaporating member, a condensate pump utilizing forces inherent in the apparatus for removing moisture from the room and a pipe for discharging said condensate from said apparatus by said pump.

9. Room cooling apparatus comprising an air cooling member, a refrigerant liquefying member for liquefying refrigerant, refrigerant expansion means whereby the expansion of refrigerant liquefied in said refrigerant liquefying member refrigerates said air cooling member, a moisture condensate receiver for said air cooling member, a condensate pump starting and stopping substantially simultaneously with one of said members for removing condensate from said receiver, and a pipe for discharging said condensate from said apparatus by said pump.

10. Room cooling apparatus comprising an air cooling member, a refrigerant liquefying member for liquefying refrigerant, refrigerant expansion means whereby the expansion of refrigerant liquefied in said refrigerant liquefying member refrigerates said air cooling member, an air circulating member, a moisture condensate receiver for said air cooling member, a condensate pump starting and stopping substantially simultaneously with one of said members for removing condensate from said receiver, and a pipe for discharging said condensate from said apparatus by said pump.

HARRY B. HULL.